United States Patent [19]

Karhan et al.

[11] 4,352,034

[45] Sep. 28, 1982

[54] STATOR CORE WITH AXIAL AND RADIAL COOLING FOR DYNAMOELECTRIC MACHINES WTH AIR-GAP STATOR WINDINGS

[75] Inventors: Barry L. Karhan, Ballston Lake; James B. Archibald, Schenectady, both of N.Y.

[73] Assignee: General Electric Company, Schenectady, N.Y.

[21] Appl. No.: 218,627

[22] Filed: Dec. 22, 1980

[51] Int. Cl.³ .............................................. H02K 9/00
[52] U.S. Cl. ......................................... 310/59; 310/55
[58] Field of Search .................................. 310/52–60, 310/64, 65, 216, 254, 258, 259

[56] References Cited

U.S. PATENT DOCUMENTS

| | | | |
|---|---|---|---|
| 973,565 | 10/1910 | Reist | 310/64 |
| 1,959,527 | 5/1934 | Ehrmann | 310/64 |
| 2,099,575 | 11/1937 | Savage | 310/57 |
| 2,742,582 | 4/1956 | Bahn | 310/55 |
| 2,873,393 | 2/1959 | Baudry | 310/55 |
| 3,116,429 | 12/1963 | Harrington | 310/65 |
| 3,171,996 | 3/1965 | Alger | 310/64 |
| 3,597,645 | 8/1971 | Duffert | 310/65 |
| 4,061,937 | 12/1977 | Goel | 310/65 |

FOREIGN PATENT DOCUMENTS 1078681 3/1960 Fed. Rep. of Germany ........ 310/64

Primary Examiner—R. Skudy
Attorney, Agent, or Firm—John F. Ahern

[57] ABSTRACT

A stator core for a dynamoelectric machine comprises a plurality of coaxially aligned annular module sections with axial cooling passages therethrough. The modules are spaced apart and fluid coupling means are disposed between the aligned axial passages in adjacent modules in a selective fashion to provide cooling flow paths which are both axially and radially directed.

8 Claims, 5 Drawing Figures

STATOR CORE WITH AXIAL AND RADIAL COOLING FOR DYNAMOELECTRIC MACHINES WTH AIR-GAP STATOR WINDINGS

This invention relates to stator cores for dynamoelectric machines having air-gap stator windings and, more particularly, it relates to arrangements of cooling passages through the stator core to provide proper thermal dissipation. Nonetheless, the cooling passage arrangement of the present invention is also applicable to conventional dynamoelectric machines.

It has recently been demonstrated that more efficient electric power generation machines may be produced by employing rotor assemblies having superconducting field windings. Since a large portion of energy losses occur in the generator rotor, increased efficiencies in this area are highly desirable. It is estimated that the use of such superconducting field windings increases the overall power plant efficiency by as much as 0.5 percent. While this may not seem like a large increase in overall efficiency, it must be borne in mind that, over the life of a machine spanning several decades, even this modest increase in efficiency can result in many millions of dollars in fuel cost savings.

One the characteristics of dynamoelectric machines employing superconducting rotor assemblies is the extremely high air-gap magnetic flux between the rotor and the stator which is typically 2 tesla or higher. With such a high level of magnetic flux, it becomes desirable to alter the conventional dynamoelectric machine design by replacing the metallic teeth between which the stator windings are disposed by nonmetallic teeth. This is also desirable in dynamoelectric machines employing conventional rotor assemblies but which are also designed to produce high levels of air-gap magnetic flux.

It is generally found that dynamoelectric machines, in which air-gap stator windings are desirable, employ rotor assemblies which are cooled by means other than a cooling gas, such as hydrogen, which is forced through the rotor windings. For example, in a dynamoelectric machine employing superconducting windings on the rotor assembly, the rotor assembly is cooled by means of liquid helium circulated through the rotor. In other machine designs in which an air-gap winding is desirable, the rotor may be directly cooled by means of a liquid such as water. Thus, in machines possessing air-gap stator winding structures, the cooling of the rotor is generally accomplished with liquid helium or water. Additionally, the stator windings themselves are generally fluid-cooled using a medium, such as water, which is passed through one or more hollow conduits in the stator windings themselves. However, in such air-gap winding machines, separate provision must be made for cooling the stator core itself since this is generally not provided by the rotor cooling or stator winding cooling systems. It is to this problem of stator core cooling that the present invention is directed.

Two basic stator core ventilation systems have been proposed to solve this problem which is generally associated with air-gap winding machines. In one stator core ventilation structure, axially extending passages are provided along the whole length of the machine. This is referred to as an axial stator core ventilation system. In another solution, the ventilation passages provided for cooling the stator core are directed radially. However, in both of these cooling systems, there is little flexibility in the choice of cooling fluid flow path.

SUMMARY OF THE INVENTION

In accordance with a preferred embodiment of the present invention a stator core comprises a number of annular modules arranged in a coaxial stack, the modules being spaced apart from one another by means of radially oriented struts, the modules also possessing axially directed passages providing a fluid communication path between the spaces between adjacent modules. The stator of the present invention also comprises means for fluidly coupling selected adjacently aligned passages in adjacent modules and means for closing selected passages. In this fashion a combined axial and radial flow path configuration is established. (Lest any confusion arise the term "coaxial" as employed herein and in the appended claims means having the same cylindrical axis but does not imply a concentric configuration but rather a configuration analogous to washers or nuts on a common shaft.).

The fluid coupling means preferably comprises a plurality of seal collars disposed between aligned passages in adjacent modules. In this way, axial flow paths may be established for as long an extent as desirable so as to establish fluid communication between selected annular spaces between the modules. Similarly, seal plugs or other means may be provided to inhibit flow in a particular area in which the cooling requirements may not be as stringent. In this way cooling fluid flow is established to a greater degree in those areas of the stator core where its effects are more advantageous.

Accordingly, it is an object of the present invention to provide a stator core ventilation system, especially for those cores employed in dynamoelectric machines having superconducting rotors.

It is a further object of the present invention to provide a stator core having a combined axial and radial ventilation flow path system.

It is also an object of the present invention to provide a flexibly configurable ventilation system for a stator core.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
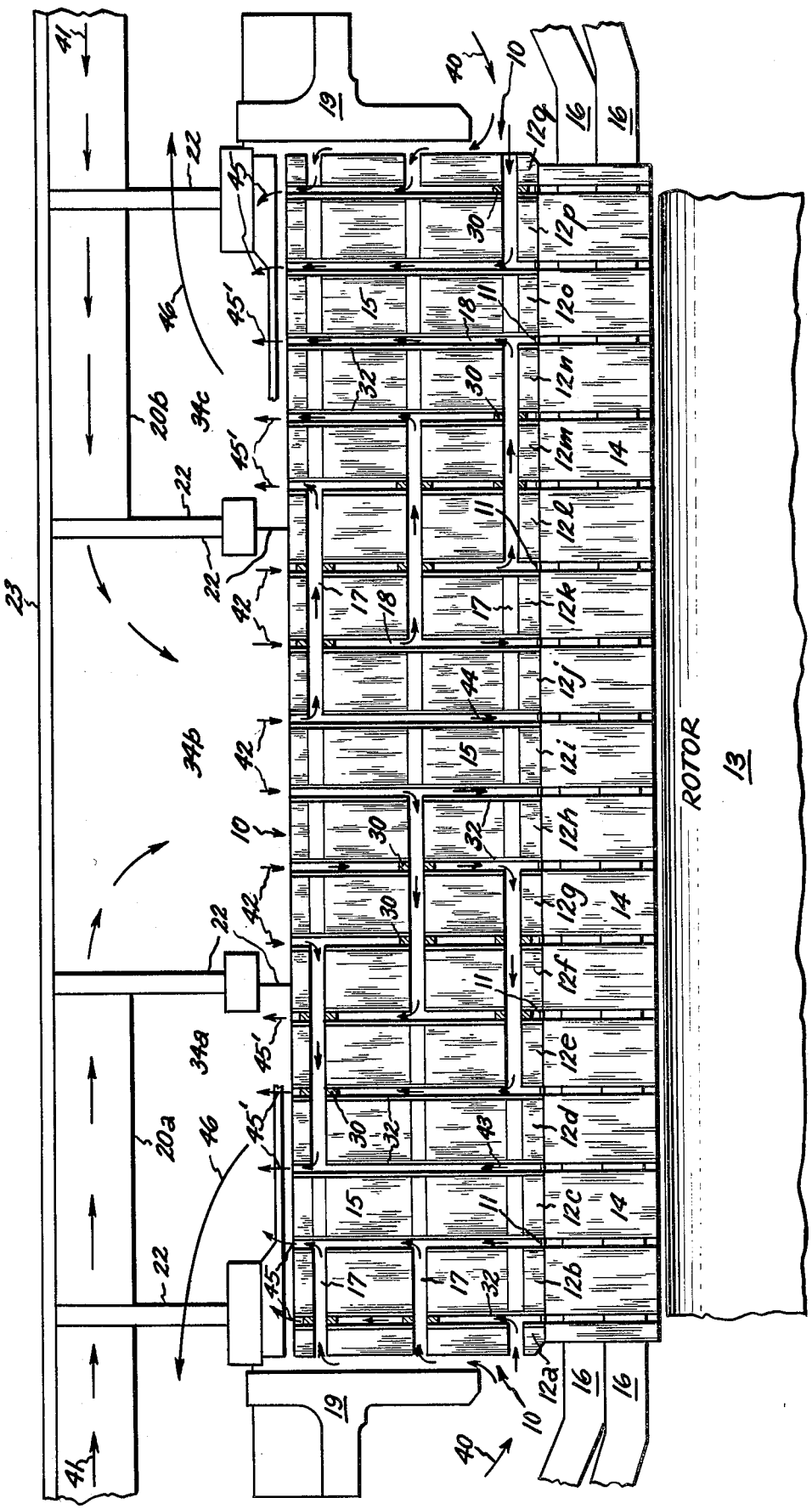
FIG. 1 is a partial cross-sectional, elevation view showing a portion of a stator core in accordance with the present invention.

FIG. 1 illustrates the stator core of the present invention. Stator core 10 comprises a number of modular sections 12a-q, each of which is annular in shape. Accordingly, each annular module has two planar circular faces and a curved circumferential face. The modular portions 12 are arranged coaxially in a spaced apart relationship so as to define annular regions between adjacent module sections. In one embodiment, which is particularly appropriate in designs requiring an air-gap winding, each module comprises an outer section of metallic laminations 15 and an inner section of nonmetallic laminations 14. The nonmetallic laminations 14 are configured to provide inwardly projecting nonmetallic teeth between which the stator winding bars 16 are disposed. The space between the nonmetallic teeth defines a stator slot and each such stator slot typically has disposed therein two stator winding bars (an upper bar and a lower bar). These bars are generally directly cooled with a fluid such as water. Also shown is rotor 13 which acts as the source of rotating magnetic flux. Rotor cooling is discussed above.

In those conventional or other special-purpose designs in which an air-gap design is not required the laminations need not comprise separately fabricated metallic portions 15 and nonmetallic portions 14. A single, monolithic metallic lamination may be employed. In either case the laminations are electrically insulated from one another as much as possible. In the case in which an inner, nonmetallic portion 14 is required for the core, this piece may be fabricated separately and later bonded to the outer portion 15. This may be accomplished after first stacking and bonding the outer portions 15 into a modular section of lamination layers. The inner nonmetallic portions may be similarly stacked and bonded, then inserted in and fixed to the metallic outer portion 15.

Each modular section 12 preferably comprises a number of layers with each layer possessing a number of sectorially shaped laminations such as shown and described in FIG. 2 below. The outer portion 15 of the laminations possesses holes therein which, after being stacked up and assembled in layers, are aligned to provide axial passages 17. Radial passages 18 are provided by spacing the modular sections 12 apart by a fixed distance, for example, by means of radial struts 33 (see FIG. 2). These struts also serve as load-bearing and clamping pressure transmitting elements between the modular sections. The seal collars and plugs also serve to transmit the clamping force exerted by flanges 19 to hold the modular stack together. The struts are radially oriented but are not shown in FIG. 1 for purposes of clarity.

In some design applications it is also desirable to have blocking plate laminations 32 which possess circumferential struts or baffles 11. These are shown in FIG. 1, and in FIG. 2. The baffles 11 serve to form a circular seal which generally functions to keep the core cooling fluid out of the air-gap region between the rotor and stator core. It is not necessarily desirable that this seal be tight. In those circumstances in which core cooling and rotor cooling are accomplished using the same cooling fluid, the circumferential baffles 11 are typically not present. This permits a substantial flow of core cooling fluid, typically hydrogen gas, directly into the air-gap. (It is standard practice in the art to refer to this region as the air-gap even though it is filled with a gas other than air.) The flow of gas in the air-gap is controlled, if desired, through the use of segregating baffles such as those disclosed in U.S. Pat. No. 3,348,081 issued Oct. 17, 1967 to David M. Willyoung.

A significant aspect of the present invention is also indicated by seal collars 30 which are selectively placed during the construction of the stator core so as to join selected axially extending passages through the core. It is through selected passages that the cooling fluid, typically hydrogen gas, for the stator core is supplied. These collars 30 serve to bridge the gap between the spaced apart modular sections 12. These extended passageways are preferably arranged in an axially staggered fashion as seen in FIG. 1. Moreover, the disposition of these axially joined passages is similarly staggered in a radial direction as is suggested by the placement of the collars 30 in FIG. 2, which is more particularly described below. Thus, a seemingly complex but relatively uniformly distributed array of cooling passages is defined throughout the stator core. A significant aspect of this invention is that the use of the collars 30 provides a flexible arrangement of these passages during core construction.

Since it is highly desirable, from a manufacturing viewpoint, that the laminations from which the stator core 10 is assembled, be as uniform as possible, special provisions may be made for closing off those axial passages which are not to participate in the flow of coolant. This may be provided by the use of seal plugs similar to the seal collars but which perform a blocking function, or alternatively, blocking plate laminations 32 may be provided which have holes therein only in those positions at which axial coolant flow is desired. This is the preferable means for blocking selected axial passages. These blocking plate laminations 32 are preferably slightly thicker than the rest of the laminations in the modular stack. In particular, the blocking laminations preferably comprise material which is approximately 25 mils thick, whereas the other laminations are approximately 10 to 18 mils thick.

The cooling system for the stator core of the present invention is particularly advantageous in that conventional manufacturing methods may be used. For example, the core structure may be formed in a vertical stacking operation. Near the end of the stator core clamping flanges 19 assist in aligning the core structure and holding it in a fixed position with respect to pressurizable housing 23. This housing 23 preferably contains therein supports and baffles 22 which support the weight of the stator core and which segregate the internal portion of housing 23 into three separate pressurizable chambers 34a, 34b, and 34c. In other embodiments more chambers may be employed. Furthermore, conduits 20a and 20b, commonly referred to as blister ducts, serve to supply cooling fluid to the central portion of the stator. In particular, it is important that chamber 34b is separately pressurizable from the remaining chambers in the housing.

An understanding of the cooling fluid flow paths of the sample embodiment shown in FIG. 1 is helpful for an understanding of the construction and operation of the present invention. In particular, arrow 40 indicates cooling fluid being supplied into axial ducts at either end of the machine. These axial ducts terminate in an annular intermodular region and are forced by the fluid pressure to exit these annular spaces into chamber 34a or 34c, as generally indicated by flow arrows 45 at either end of the core. The flow indicated by arrows 45 joins the flow indicated by arrows 45' to form a flow generally designated by reference arrow 46 which carries the cooling fluid to coolers or heat exchangers. Likewise, the means for supplying cooling fluid pressure also causes fluid flow through blister ducts 20a and 20b as generally indicated by flow arrows 41. The fluid circulating means may be a fan, impeller, blower, pump or other form of fluid moving device. Often it comprises a set of impeller vanes mounted on the rotor, which upon rotation drives the cooling fluid. Flow 41 enters central chamber 34b and is directed radially inward along the entire circumference of the stator core, as generally indicated by flow arrows 42. The struts 33, shown in FIG. 2, assist in maintaining a radial direction of flow. At various points along the radial inward flow, the flow is redirected axially. Following the axial passage, the flow then continues on into other intermodular spaces with which these axial passages are in fluid communication. Following this, the flow of cooling fluid proceeds in a generally radially outward direction as indicated by flow arrows 45'. Thus, this flow enters chambers 34a and 34c at either end of the machine to join with the flow indicated by arrows 45 so as to form the flow indicated generally by reference arrow 46 which carries the fluid to a cooling mechanism (not shown) disposed within the machine housing 23 and thence to fan or impeller means (not shown) which completes the cycle by circulating the flow in the direction generally indicated by arrows 40 and 41. The cooling fluid for the core is generally a gas, but the present invention of an axially-radially cooled core may also employ liquid coolants. In such cases, a dielectric fluid such as transformer oil may be employed. In the case of a liquid cooled core, positive sealing means are required to keep the liquid coolant out of the air-gap region.

Particular attention is now directed to flow arrows 43 and 44. While it might first appear that the flow indicated by arrow 43 is not coming from any source and that the flow indicated by arrow 44 is directed into a dead end, it is to be particularly noted that FIG. 1 is a cross section. While certain passages at certain axial and radial positions are in fact blocked off, there are other passages entering the intermodular region from different circumferential positions and it is these passages which account for the kinds of flow which are typified by flow arrows 43 and 44.

The number and location of the seal collars 30 and the corresponding inlets and outlets for the flow of cooling fluid through the axial holes varies circumferentially and axially to meet flow distribution and pressure drop requirements. Similarly, the number, location, and sizing of axial holes and radial ducts are based upon temperature gradient considerations in the core, as well as upon cooling fluid distribution and pressure drop considerations in the core ventilation paths. In some cases it may be desirable to include modular sections having no axial gas flow through them and only radial cooling. This is conveniently accomplished by the placement of various baffles during stator construction.

Figure 2:
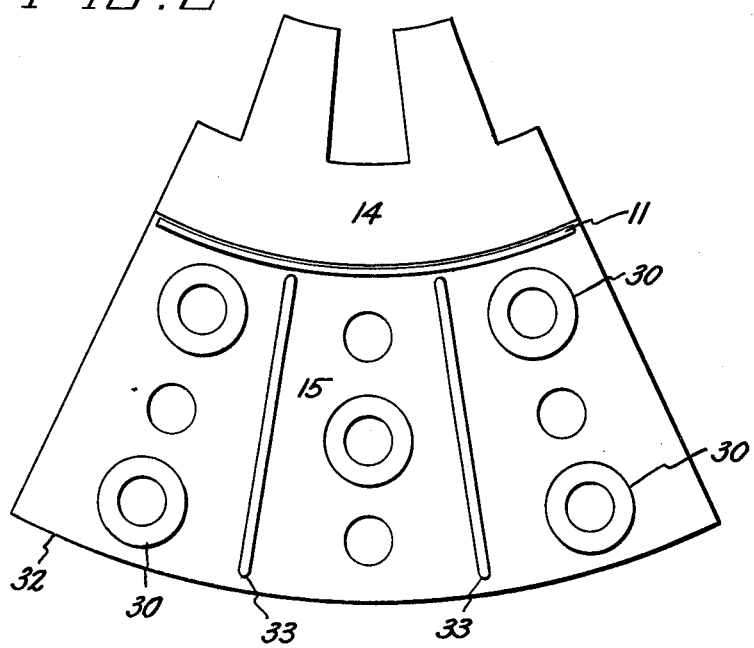
FIG. 2 illustrates a type of lamination which may be employed in constructing the stator core of the present invention.

FIG. 2 shows a blocking plate lamination 32 having a nonmetallic portion 14 and a metallic portion 15. The metallic portion typically comprises a low carbon steel composition and the nonmetallic portion typically comprises a glass fiber and epoxy resin structure. In general, however, the other (non-backing plate) laminations generally comprise a silicon steel. In particular, it is to be noted that the nonmetallic portion of the sectorially shaped lamination of FIG. 2 possesses inwardly projecting teeth which form the slots in which the stator winding bars 16 are disposed. Blocking plate lamination 32 also indicates the presence, in a scattered and selected fashion, of seal collars 30 which serve to fluidly couple adjacently aligned axial cooling fluid passages. Furthermore, attached to blocking plate lamination 32 are struts 33 which act to space the modular sections apart so as to define between them an annular passage for the radial flow of cooling fluid. These struts 33 also assist in maintaining the flow in a general radial direction in the intermodular region. The other holes in the lamination indicate fluid communciation with the immediately adjacent intermodular region. If such communication is undesirable in a particular location, it is only necessary to select a blocking plate with the proper distribution of holes so as to block undesired fluid communication. Other devices such as seal plugs may be used to perform a similar function. Such plugs are shown in FIG. 3c. The struts 33 are typically welded to the metal portion of the lamination and the seal collars 30 may be either affixed in an aligned position with a lamination hole or may be provided with a lip as shown in FIG. 3b which extends partway into the opening so as to hold the seal collar or seal plug in place.

Figure 3A:
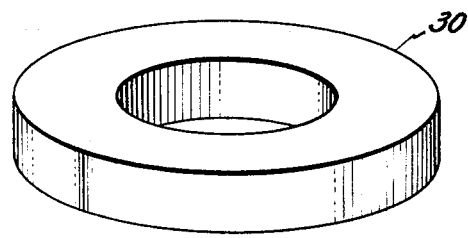
FIGS. 3a through 3c illustrate several forms of seal collars and plugs which may be employed to either join or plug selected ventilation passages.
Figure 3B:
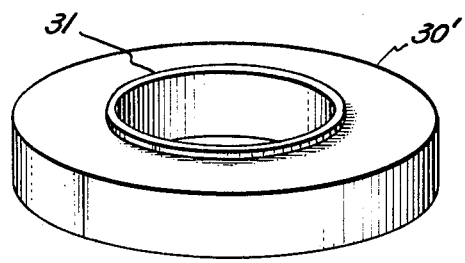
Figure 3C:
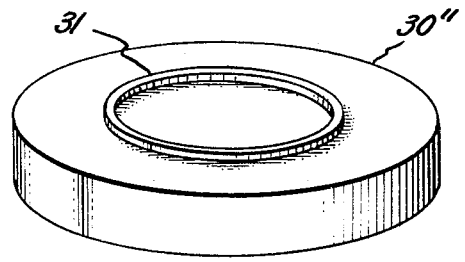

FIGS. 3a, 3b and 3c more particularly indicate the seal collars and seal plug. In particular, FIG. 3a shows a seal collar 30 which is preferably held in place by means of an adhesive, such as epoxy, or by welding. FIG. 3b shows a seal collar 30' which is preferably held in place by means of lip 31, with or without the assistance of an adhesive material. FIG. 3c illustrates a seal plug with lip 31 but with no aperture therein. This plug provides blocking of selected passages.

From the above, it is seen that the stator core of the present invention provides an improved core ventilation system which can reduce the stator core temperature and significantly increase the uniformity of the temperature distribution throughout the core. in particular, this stator core, in a dynamoelectric machine, offers several significant advantages over that found in the prior art. In particular, conventional assembly and manufacturing methods may be employed. Second, the design of the present invention is easily modified for generators of larger ratings if so desired. The present invention is also consistent with present magnetic core manufacturing practices which involve stacking of insulated steel laminations.

While the invention has been described in detail herein in accord with certain perferred embodiments thereof, many modifications and changes therein may be effected by those skilled in the art. Accordingly, it is intended by the appended claims to cover all such modifications and changes as fall within the true spirit and scope of the invention.

The invention claimed is:

1. A gas-cooled stator core for a dynamoelectric machine, especially a machine exhibiting a high air-gap magnetic flux, said core comprising:
   a plurality of annular modules each including a plurality of laminations arranged coaxially, the exterior surfaces of boundary laminations of said modules possessing radially oriented struts and circumferential struts affixed to the planar surfaces thereof so as to maintain an axial separation between said modules, said modules also possessing axially directed passages therethrough, said passages being similarly arranged in each module so as to permit partial axial gas flow through said core;
   means for selectively coupling less than all of said adjacently aligned passages in adjacent modules; and
   means for selectively closing other passages to provide combined partial circumferential, partial axial and partial radial gas cooling flow paths through said core.

2. The stator core of claim 1 in which said selective coupling means comprises a plurality of insertable collars disposed between the aligned passages of adjacent modules, each of said collars having a lip extending into said passage so as to hold the same in position.

3. The stator core of claim 1 in which said laminations comprise a radially outer metallic portion and a radially inner nonmetallic portion having nonmetallic teeth extending therefrom in a radially inner direction.

4. The stator core of claim 2 in which at least some of said collars are closed over to provide a plurality of gas blocking plugs disposed between aligned passages of adjacent modules, so as to provide means partially blocking axial passage of cooling gas and the boundary lamination of said module becomes a blocking lamination.

5. The stator core of claim 4 in which said closed collars comprise blocking laminations with passage-defining holes in selected locations.

6. The stator core of claim 5 further including:
a surrounding pressurizable housing with interior supports and baffles so as to divide the core into several regions, so that a cooling fluid can be made to flow radially inward in some regions and radially outward in other regions.

7. The stator core of claim 6 in which said housing possesses at least one duct for supplying cooling fluid to a central region surrounding said coaxially arranged modules.

8. The stator core of claim 1 in which said laminations comprise a unitary metallic structure.

* * * * *